HARRY A. EPPERSON
SAMUEL GOLDSTEIN
JAMES P. NICKLAS
ROBERT H. STOTZ
INVENTORS

BY Samuel Lindenberg
ATTORNEY

Dec. 20, 1966 H. A. EPPERSON ETAL 3,293,610
INTERRUPT LOGIC SYSTEM FOR COMPUTERS
Filed Jan. 3, 1963 6 Sheets-Sheet 3
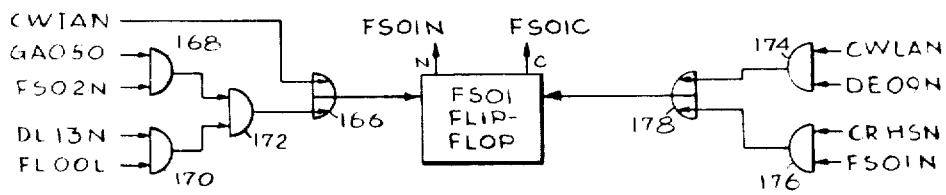
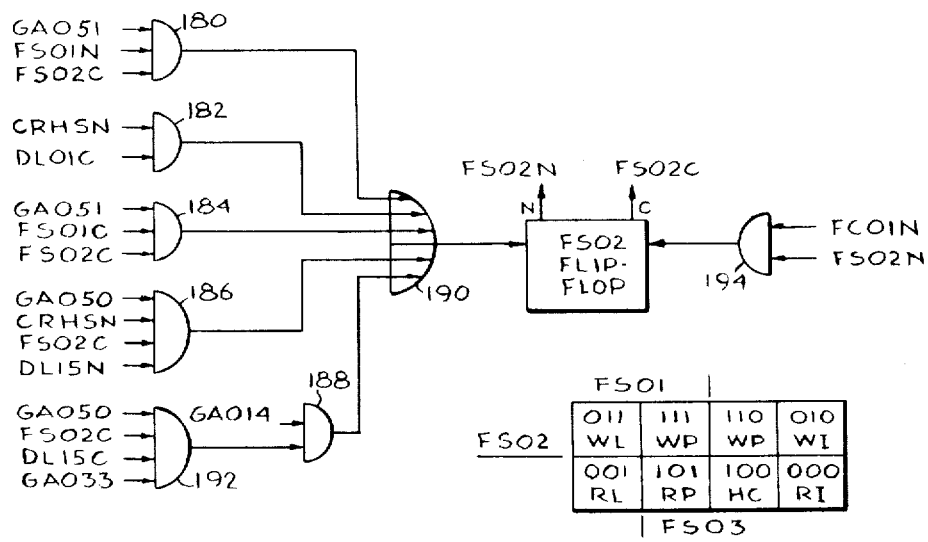
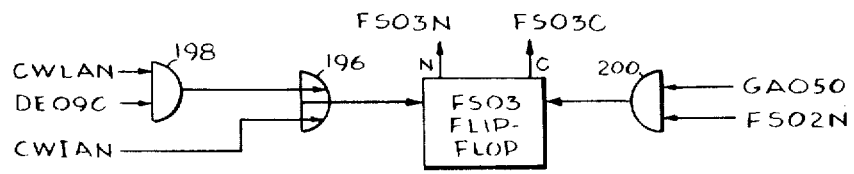
Fig. 2D
HARRY A. EPPERSON
SAMUEL GOLDSTEIN
JAMES P. NICKLAS
ROBERT H. STOTZ
INVENTORS
BY Samuel Lindenberg
ATTORNEY

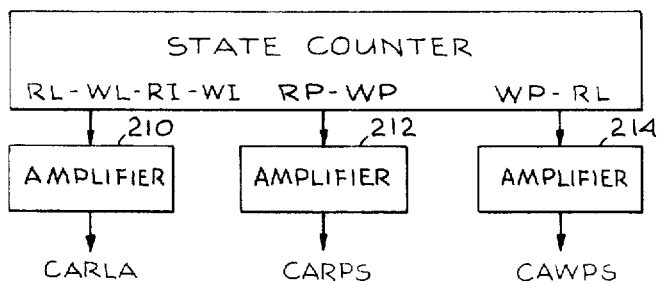
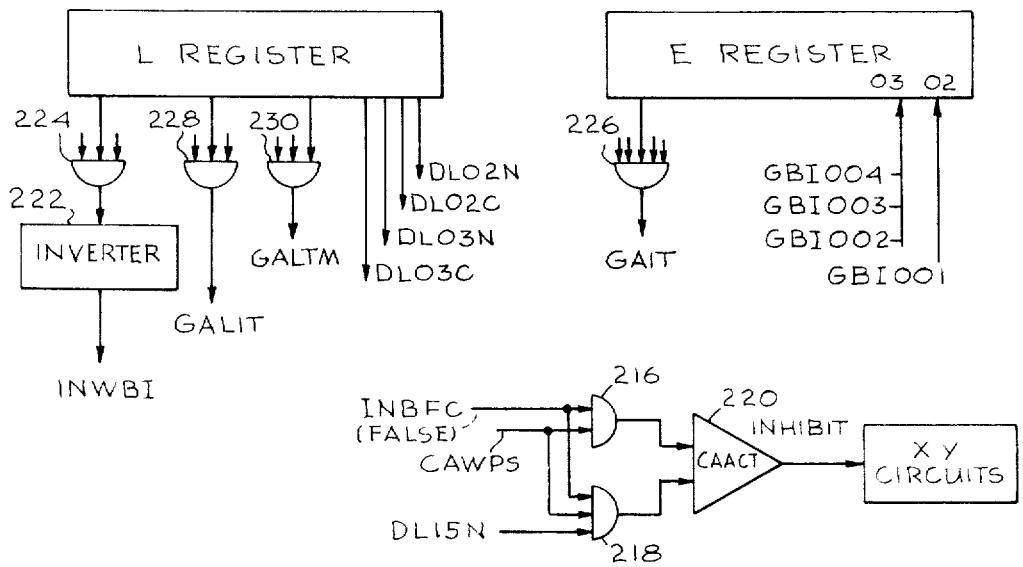
 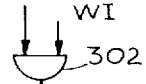 

HARRY A. EPPERSON
SAMUEL GOLDSTEIN
JAMES P. NICKLAS
ROBERT H. STOTZ
INVENTORS

BY Samuel Lindenberg

ATTORNEY

United States Patent Office 3,293,610
Patented Dec. 20, 1966

3,293,610
INTERRUPT LOGIC SYSTEM FOR COMPUTERS
Harry A. Epperson and Samuel Goldstein, Los Angeles, and James P. Nicklas, Woodland Hills, Calif., and Robert H. Stotz, Boston, Mass., assignors, by mesne assignments, to The Bunker-Ramo Corporation, Stamford, Conn., a corporation of Delaware
Filed Jan. 3, 1963, Ser. No. 249,211
6 Claims. (Cl. 340—172.5)

This invention relates to computers and more particularly to an improved arrangement for expeditiously interrupting the internal operation of a computer so that it can operate with external devices.

In the situations where a computer is operated in close conjunction with a variety of peripheral apparatus, such as magnetic tape or punched card apparatus, it is highly desirable to be able to interrupt the computer automatically in the event certain situations arise. These situations may be either abnormal or normal situations. As an example of the abnormal situation, a transient power failure may occur, which, although not disabling, can cause program error of some sort and therefore the operator should be alerted to this. A normal situation arises, for example, when new data from an external input device is to be loaded into the computer. This normal situation requires means for interrupting the computer in whatever processing it is conducting in order that it may receive and store the incoming data.

The manner in which interrupt situations are handled in present computers is to program the computer in such a way that it will always be in the proper state when it receives a signal that data is available for transfer into the computer. However, such a procedure is wasteful in both requiring programing time and space as well as computing time.

An object of this invention is to provide a system wherein the computer may continue its processing to the very moment incoming data is available, at which time it may ingest such data.

Another object of the present invention is to provide an arrangement for an interrupt logic system which requires a minimum disturbance in computing time.

Yet another object of the present invention is the provision of an interrupt logic system which affords a minimum of unwanted program stoppages.

Still another object of the present invention is the provision of a novel and useful interrupt logic system for a computer.

These and other objects of the present invention may be achieved in a circuit arrangement which is designed to cooperate with a computer whereby signals from the peripheral devices with which the computer is to be operated, which indicate that the devices are available for a transfer data, or that the device is busy, or that the device is inoperative, are combined with signals from the computer indicative of the status of operation of the computer. The results of these combined signals are applied to the computer to cause it to go into an interrupt mode of operation as determined by the type of interrupt signal derived from the combined signals. At the conclusion of this interrupt mode of operation the computer is instructed to continue operation as if an interrupt had not occurred. In response to the interrupt signal the computer is prevented from reading out the next command from its memory and is prevented from altering the address of this command. Instead, an interrupt command is entered into the computer for the purpose of ordering the computer through the interrupt routine which has been specified. At the termination of the interrupt routine the computer is reset to the state where it can continue its operation as if no interrupt had occurred, except for the changes in data contained by the memory as a result of the interrupt operation.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

FIGURE 2D is a logic block diagram of a state counter which is used in the computer;

FIGURE 3 is a block diagram of a portion of the computer shown to indicate the sources of various signals used by the interrupt logic apparatus comprising the present invention.

Figure 1:
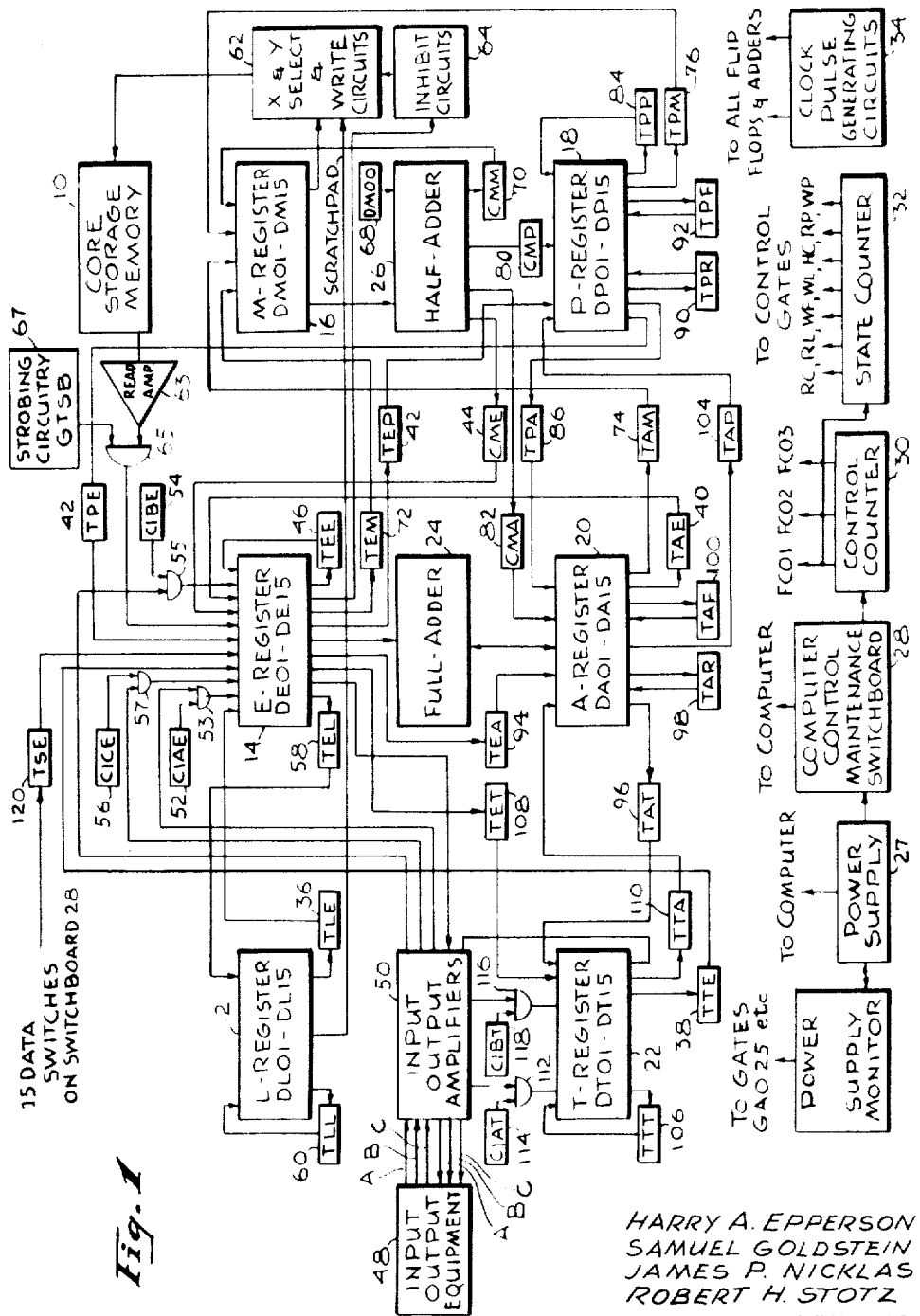
FIGURE 1 is a block diagram of a computer shown to facilitate an understanding of the invention.

In order to facilitate both the description and an understanding of this invention, it will be described in conjunction with a specific computer with which this invention was built and operated. However, it will be apparent to those skilled in the art that the principles embodied in the invention are applicable to types of computers other than the one with which the invention is specifically described. Accordingly, it is to be understood that this explanation is by way of illustration and not by way of limitation.

In an application for patent by Schneberger et al. for a stored logic computer which was filed on January 8, 1962, and bears Serial No. 164,660, now Patent No. 3,258,748 and which is assigned to a common assignee, there is described and claimed a computer which is of a type with which the embodiment of this invention may be combined. As previously indicated, in order to facilitate an understanding of this invention, it will be described in combination with this computer. For this purpose, the description of FIGURES 1, 2A, 2B, 2C and 2D of the aforementioned application together with the appropriate figures of the drawing form a part hereof.

The stored logic concept specifies that the logic for any instructions above microcommand level is stored in the computer memory in the form of a microprogram, i.e., a sequence of microcommands. Each one of these microcommands will be henceforth designated as a logand. A group of these logands performs a basic operation. Such a group of logands will be henceforth referred to as a logram. A set of these lograms are employed to effectuate a particular task. Once a set of lograms has been designed, another programmer may use these lograms as the building blocks around which he can design his program. Thus, an effective instruction repertoire can be established so that each time a new program is required the programer need not develop this program by individual logands. He may take advantage of the sets of lograms previously developed for quickly accomplishing the required programing.

Reference is now made to FIGURE 1, which is a block diagram of the stored logic computer. The computer contains a random-access memory 10, exemplified as a magnetic core storage memory. Logic instructions or logands are entered into the memory prior to the initiation of the data processing function they specify. Logands are required to instruct the remainder of the computer how to process data which is entered therein. These logands may consist by way of example, of 15 bits. Groups of these 15 bits logands for achieving a desired set of basic operations are designated as lograms.

In addition to the core memory, the stored logic machine includes six flip-flop registers, each capable of storing 15 bits. These registers are designated as an L-register 12, an E-register 14, an M-register 16, a P-register 18, an A-register 20, and a T-register 22. In addition to the registers, the computer contains a 15 bit parallel full-adder 24 and a 15 bit parallel half-adder 26. In addition, the machine has a power supply 27, and a power supply monitor 29, a computer control and maintenance switchboard 28, a control counter 30, a state counter 32, clock-pulse generating circuits 34, and various control circuits for operation of the machine which will be discussed as this description progresses.

The E-register is used principally for holding information read from and/or written into the memory. The E-register also accepts the transfer of 15 bit operands from the L-register, the P-register, the A-register, the T-register, and the M-register via the half-adder 26. Transfers to the E-register from the various other registers are shown by the lines ending in arrows from the respective registers, which arrows terminate at the E-register. The logic and gating circuitry required for effectuating a transfer to the E-register is represented by rectangles in the path of these lines. Thus, the transfer of 15 bits of data from the L-register to the E-register is under control of TLE circuits 36. The transfer from the T-register to the E-register is under control of TTE circuits 38. The transfer from the A-register to the E-register is under control of TAE circuits 40. The transfer from the P-register to the E-register requires operation of circuits TPE 42. The transfer from the M-register via the half-adder 26 to the E-register requires the operation of CME circuits 44. In addition, the E-register circulates its contents via control and logic circuits TEE 46.

In addition, the E-register can receive data from input-output equipment 48 through any one of three cables A, B, C, via input-output amplifiers 50. The selection of cable A is under control of CIAE logic circuits 52 and gates 53. The selection of cable B is under control of CIBE logic circuits 54 and gates 55. The selection of cable C is under control of CICE logic circuits 56 and gates 57. The E-register is the only register that receives information directly from the core memory and from which information can be written directly into the memory.

The L-register 12 is used to hold a logand while it is being interpreted by the logic circuits of the computer. The L-register receives its input from the E-register over gating and logic circuits TEL 58. The logand signals in the L-register are the logic signals which, in conjunction with other sequencing signals, whose derivation is to be described, direct the operation of the computer. The low-order six bits of the L-register may be employed to address memory locations 0 through 63 of the magnetic-core memory. This portion of the magnetic-core memory is designated as a scratch-pad memory. The scratch-pad section of the memory provides a temporary storage for intermediate results of computation or logands. The L-register circulates its contents, using the TLL 60 gating and logic circuits. The L-register can address the core memory 10 through addressing and driving circuits, designated as X and Y select-and-write circuits 62. The data entered into the core storage memory 10 is that contained in the E-register 14. Thus, when the memory is addressed by the L-register for the purpose of writing, the data entered into the scratch-pad memory is that data which is in the E-register at the time.

The core storage memory 10 is of a type well known in the art, and consists of a plurality of core planes, each of which contains magnetic cores disposed in columns and rows. The columns and rows of cores are aligned so that a row coil is coupled to the same row of cores in each core plane. A column coil is coupled to the same column of cores in each core plane. The row and column coils are commonly referred to as X and Y coils. Selection of a correspondingly positioned core in each core plane for the purpose of being driven toward one of its two states of magnetic remanence is achieved by applying current to the X and Y coils coupled to these cores. There is a separate winding for each core plane which is coupled to every coil in the core plane. This is known as an inhibit winding. Those of the cores which it is desired to maintain in the state of remanence opposite to which they would be driven by the excitation of the X and Y cores may be so maintained by simultaneously applying an inhibit-current drive to the inhibit coil for that core plane. The E-register output is applied to inhibit circuits 64, which are operated in conjunction with the X and Y select-and-write circuits for entering or writing into the core storage memory the contents of the E-register in either a location in the scratch-pad memory, whose address is provided by the L-register, or in any location in the memory in an address which is provided by the M-register.

The output of the core storage memory, consisting of a bit of data obtained from each core which is interrogated, is applied to the reading amplifiers 63. The outputs of the reading amplifiers are entered into the E-register through gates 65 under control of strobing pulses provided by strobing circuitry 67. This insures that the output of the core is read at a time when false reading signals are minimized.

The M-register 16 is used principally for addressing any one of the locations of the core memory. It operates in conjunction with the half-adder 26 to increment an address in the M-register, when so ordered, in order to provide the address of the next logand to be derived from the memory for execution. The M-register output is always applied to the half-adder 26. Whether or not the contents of the half-adder are incremented by a DMOO flip-flop circuit 68. The flip-flop is normally in a state where it will not increment the address in the half-adder. It requires an actuating signal to be driven to the incrementing state and returns the succeeding clock pulse. The half-adder contents are returned to the M-register through logic and gating circuits, designated as TMM, 70. The M-register can also receive the contents of the E-register over the TEM logic and gating circuits 72. The M-register can receive the contents of the A-register over the TAM logic and gating circuits 74. The P-register may enter its contents into the M-register over the TPM logic and gating circuits 76.

It was pointed out that the M-register, by controlling the X and Y select-and-write circuits, can provide the address of any location in the core storage memory for the purpose of either reading or writing. By means of the transfer circuitry just described, the contents of either the A-register, the P-register, or the E-register, may be substituted into the M-register in place of the contents of the M-register. Thus, the core memory may effectively be addressed by an address within the E, A, or P-registers, as well as an address in the M-register. Furthermore, by transferring the contents of the L or T-register through one of the other registers into the M-register, the memory can be addressed from any one of the registers of the computer.

If desired, the address in the M-register can be transferred to one of the other registers to be held there until the operations specified by the logand read from the substituted address have been carried out, at which time the M-register address can be transferred back.

There is no direct transfer out of data from the M-register. This always occurs thru the half-adder, i.e. from M-register to half-adder to other registers. This facility is provided by the control-and-gating circuitry CME 44, whereby the output of the half-adder may be entered into the P-register thru control-and-gating circuitry CMP, 80. The M-register contents can be entered into the A-register via the half-adder by the control-and-gating circuitry CMA, 82.

Considering, next, the P-register, its contents are circulated by TPP control-and-gating circuitry 84. The contents of the P-register are transferred into the A-register over TPA control-and-gating circuitry 86. The contents of the P-register may be entered into the E-register over the TPE control-and-gating circuitry 40. When required, the contents of the P-register may be shifted right under control of the gating-and-control circuitry 90. The contents of the P-register may be shifted left under control of the gating-and-control circuitry TPF, 92.

The contents of the A-register may be entered into the E-register via TAE gating-and-control circuitry 40. The contents of the A-register may be entered into the T-register via TAT control-and-gating circuitry 96. The contents of the A-register may be shifted right under TAR control-and-gating circuitry 98. The contents of the A-register may be shifted left under TAF control-and-gating circuitry 100. The A-register, which may also be designated as an arithmetic register, is used primarily to hold the results of arithmetic operations performed by the adder 24 and some logic operations. The A-register receives its principal inputs from the full-adder 24. It may, however, receive its input from other registers, as indicated. The A-register may also transfer its contents into the P-register under control of the TAP control-and-logic circuits 104. The A-register and the P-register may be shifted left or right, either alone or while coupled together. Thus, the P-register may be used as an extension of the A-register for shift multiply-and-divide operations, when required.

The T-register is used principally for transferring data from the computer to the output devices. It may be used for transmission of output, while the rest of the computer proceeds independently. It may accept data from the E-register thru the TET control-and-logic circuits 108. It may accept data from the A-register thru the TAT control-and-logic circuits 96. Data from the T-register may be circulated thru the TTT control-and-logic circuits 106. Data from the T-register may be transferred to the E-register under control of TTE control-and-logic circuit 28. Data from the T-register may be transferred to the A-register under control of the TTA control-and-logic circuits 110. Input to the T-register from the input-output equipment occurs via the input-output amplifiers through gates 112, which also require control signals from CIAT control circuitry 114, or through gates 116, controlled by CIBT control circuitry 118. The gates 112 admit data from an A cable, and the gates 116 admit data from the B cable.

The L, E, M, P, A, and T registers each contain fifteen flip-flop circuits, known as delay flip-flop circuits since the output, in response to an input signal, does not occur until the occurrence of the next clock pulse succeeding the one assisting in driving the flip-flop. These flip-flop outputs are designated by the letter "D" followed by the letter designating the register, followed by a number indicating the position in the register followed by an "N" or a "C." N designates that the output is true or normal and C false or complement. Thus DL12N indicates that the twelfth flip-flop of the L-register has a true output. The registers, unless instructed otherwise, by a logand, circulate their contents on every clock pulse. Each one of the "T" or "C" transfer logic circuits effectively constitutes fifteen coincidence gates having the fifteen "true sides" of the delay flip-flops as one input and a transfer signal as a second input. The transfer signal is usually provided by an amplifier, called a control amplifier, which is driven by the logical output of gates which decode the logand in the L-register. Clock signals time the entry of data into the registers.

The very first logand entry into the memory may be by setting switches which are furnished with the computer-control-and-maintenance switchboard 28. The setting of these switches is entered via the TSE gating and control circuits 120 into the E-register. This first instruction is then transferred into the L-register, which may, in response thereto, control the entry of data into the core storage from the input-output equipment. The instructions or lograms entered into the core storage may thereafter be used for operating the computer.

The control counter 30 is a three flip-flop counter and therefore may be set in any one of eight different states. It is used for manual control of computer operation from the maintenance panel. The states of interest, in accordance with this invention, are the ones which occur when the computer is running. When the three stages of the control counter are in their true states, their respective outputs may be designated as FCO1N, FCO2N, FCO3N. By actuating a switch on the switchboard 28 for operating the computer automatically, the control counter is operated to the state in which all three stages signify their "true" outputs.

Figure 2A:
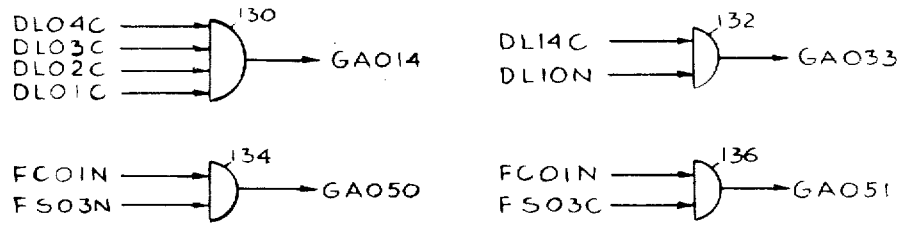
FIGURES 2A, 2B and 2C are logic block diagrams illustrating how input signals for a state counter of the computer shown in FIGURE 2D are derived.
Figure 2B:
Figure 2C:
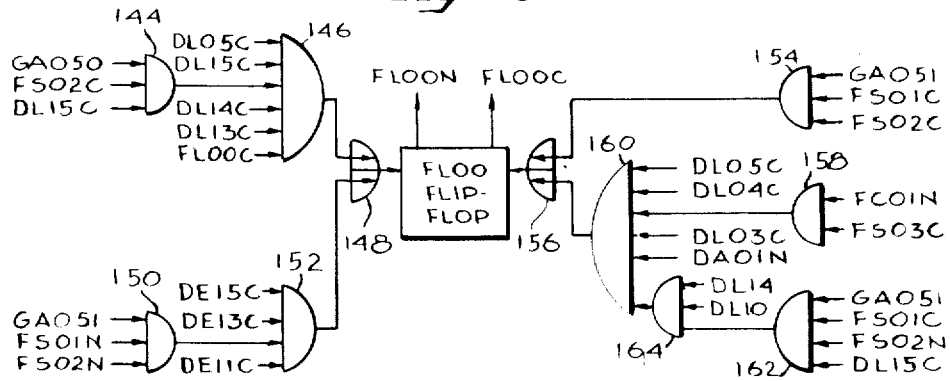

State counter 32 consists of three flip-flop stages; seven distinct control states for the computer are defined by the outputs from this state counter. FIGURE 2D is a block diagram showing the three flip-flop stages, respectively FSO1, FSO2, and FSO3 for the state counter and the logic which sets these flip-flop circuits in its various states. FIGURES 2A, 2B and 2C are logic diagrams which are used to define some of the input terms in the logic shown in FIGURE 2D. These diagrams illustrate how complex logic control signals are obtained from simple logic signals and are used to simplify the logic required to be shown in FIGURE 2D to actuate the flip-flop stages. Reference is now made to FIGURE 2A, wherein an AND gate 130 provides an output signal, which is designated by GAO14, when all of its inputs are simultaneously present. These inputs are the complement outputs of the first four flip-flop stages of the L-register. These are designated as DLO1C, DLO2C, DLO3C, and DLO4C. The letter "C" designates that the output is the complement or false output. The letter "N" designates that the output is true, or the normal output.

An AND gate 132 provides an output signal which is designated by GAO33 when both of its inputs, respectively DL14C and DL10N, are present. These are taken from the fourteenth and tenth flip-flops in the L-register. GAO14 and GAO33 exemplify logand decoding. An output signal, designated as GAO50, is derived from an AND gate 134 when its two inputs are simultaneously present. These two inputs are FCO1N and FCO3N. These are the respective true outputs derived from the first and third stages of the control counter. An output designated as GAO51 is derived from an AND gate 136 in the presence of its two inputs. These two inputs are respectively FCO1N and FSO3C. These are the true outputs of the first stage of the control counter and the complement output of the third stage of the state counter.

Referring now to FIGURE 2B, an AND gate 138 provides an output signal designated by CW1AN in the presence of the three inputs, respectively FSO1C, FSO2N, and GAO51. FSO1C is the complement output of the first stage of the state counter, and FSO2N is the true output of the second stage of the state counter. The GAO51 signal is derived from AND gate 136, shown in FIGURE 2A. An AND gate 140 supplies an output designated as CRHSN in the presence of the inputs GAO50, derived from AND gate 134 shown in FIGURE 2A, FSO2C, the complement output of the second stage of the state counter, and DL15C, which is the complement output of the fifteenth stage of the L-register. An AND gate 142 provides an output designated by CWLAN in the presence of inputs GAO51, FSO2N and FSO1N.

In FIGURE 2C, the logic required to drive a flip-flop designated as FLOO to provide either an output FLOON or FLOOC is shown. An output is derived from an AND gate 144 in the simultaneous presence of inputs GAO50, FSO2C and DL15C. The output of AND gate 144 is applied to an AND gate 146. The output of the AND gate 146 is applied to the flip-flop FLOO through an OR gate 148. AND gate 146 requires the simultaneous presence of the output of AND gate 144 as well as inputs DLO5C, DL15C, and DL13C, and FLOOC, which is the complement output of the FLOO flip-flop.

An AND gate 150 can provide an output to a succeeding AND gate 152 in the simultaneous presence of inputs GAO51, FSO1N, and FSO2N. AND gate 152 can drive flip-flop FLOO through OR gate 148 to provide a normal output in the simultaneous presence of the output of AND gate 150, as well as complement outputs from E-register flip-flop stages DE11C, DE13C, and DE15C. FLOO flip-flop is driven to provide a complement output FLOOC in response to the output of an AND gate 154, which drives the flip-flop through an OR gate 156. The AND gate requires simultaneous inputs, GAO51, FSO1C, and FSO2C.

FLOO may also be driven to provide a complimentary output by an alternative logic network. This includes the output of an AND gate 158 having as its input FCO1N and FSO3C. This AND gate output is applied to a following AND gate 160. An AND gate 162 provides an output in the presence of inputs GAO51, FSO1C, FSO2N and DL15C. Its output drives a succeeding AND gate 164, which can provide an output to the AND gate 160 in the simultaneous presence of inputs DL14 and DL10. AND gate 160 can therefore drive the FLOO flip-flop to its complement output state in the simultaneous presence of the outputs of AND gates 158, 164, DLO5N, DLO4C, DLO3C, and DAO1N. These outputs are respectively derived from the L-register fifth stage, L-register fourth stage, L-register third stage, and A-register first stage.

Referring now to FIGURE 2D, the logic for driving the state counter flip-flops FSO1, FSO2, and FSO3, may now be understood. The flip-flop FSO1 is driven to provide FSO1N output in response to CWAIN signals (derived from AND gate 138), which are applied to the flip-flop through an OR gate 166. An AND gate 168 provides an output in response to the presence at its input signals GAO50 and FSO2N. An AND gate 170 can provide an output in the presence of simultaneous inputs DL13N and FLOON. The AND gates 168 and 170 drive a succeeding AND gate 172 which can drive flip-flop FSO1 to provide an FSO1N output.

FSO1 flip-flop is driven to provide an FSO1C output by the signals derived from either an AND gate 174 or an AND gate 176, which are applied to the flip-flop through an OR gate 178. AND gate 174 can provide an output in response to a CWLAN input and a DEO9N input. AND gate 176 can provide an output in response to a CRHSN input and an FSO1N input.

The second stage of the state counter, namely FSO2 flip-flop, can be driven to provide an FSO2N output in response to the output of an AND gate 180, or an AND gate 182, or an AND gate 184, or an AND gate 186, or an AND gate 188. These AND gates are all connected to an OR gate 190, the output of which drives the flip-flop to its normal or true state. AND gate 180 requires the simultaneous presence at its input of signals GAO51, FSO1N, and FSO2C. AND gate 182 requires the simultaneous presence at its input of signals CRHSN, DLO1C. AND gate 184 requires the simultaneous presence at its input of signals GAO51, FSO1C and FSO2C. AND gate 186 requires the simultaneous presence at its input of signals GAO50, CRHSN, FSO2C, and DL15N. AND gate 188 provides an output in response to an input consisting of signals GAO14 and the output of an AND gate 192. The AND gate 192 provides an output when there are simultaneously present at its inputs the signals GAO50, FSO2C, DL15C, and GAO33.

The FSO2 flip-flop is driven to provide a complement output (FSO2C) by the output of an AND gate 194. This AND gate provides an output in the simultaneous presence of signals FCO1N, FSO2N.

The third stage of the state counter, flip-flop FSO3, is actuated to provide an FSO3N output in response to either a CWIAN signal, which is applied to it through an OR gate 196, or to the output of an AND gate 198. AND gate 198 provides an output in the simultaneous presence of signals CWLAN and DEO9C. The latter signal is the complement output of the ninth flip-flop in the E-register. Flip-flop FSO3 is driven to its complement state in response to the output of an AND gate 198. This AND gate provides an output in the simultaneous presence of signals GAO50 and FSO2N.

Also shown in FIGURE 2D is a VEITCH diagram for the counter. The various count states of the counter are designated by binary numbers 000 through 111. Instead of referring hereafter to these counter states by their numerical count conditions, they are referred to by letters which are associated with the number in the box. Thus, 000 represents the RI state, 001 the RL state, 010 the WI state, 011 the WL state, 100 the HC state, 101 the RP state, and 110 and 111 the WP state. When combined with GAO51 the WI signal becomes CWIAN. The WL signal becomes CWLAN.

To interpret the VEITCH diagram, regard the HC state (100), directly below the box in which the letters "HC" appear, as FSO3. Above, to the left and to the right of the box in which "HC" appears, it will be seen that the letters FSO1 and FSO2 do not appear.

The states which the flip-flops assume in order to represent HC may be derived from the VEITCH diagram and also may be represented by a logical equation as follows:

$$HC = FSO3N \cdot FSO2C \cdot FSO1C$$

Taking another example, note RL on the diagram. Looking to the left, to the right and below the RL box, no state counter flip-flop designations are found. Looking above this box, FSO1 may be found. Thus, the states of the state counter stages may be represented by the logical equation $$RL = FSO1N \cdot FSO2C \cdot FSO3C$$

It is believed that with the foregoing examples, the use of the diagram to indicate the states of the counter may be easily deduced.

For the purpose of the interrupt routine to be described, the state counter advances through states commencing with RL to WL to RI to WI to RP to WP and back to WL.

The computer which has been described should be capable of providing certain signals in order to cooperate with the interrupt logic system comprising the present invention. It must also provide such signals as are necessary to coordinate the operation of the interrupt apparatus with the proper clock times of the computer.

The description up to now has been of a computer of the type with which the invention has been operated. The description which follows is of the invention itself.

FIGURE 3 is a block diagram repeating a portion of the computer just described for the purpose of showing the structures in the computer from which the necessary signals are derived as well as for showing the apparatus to which signals from the interrupt logic apparatus are applied. In FIGURE 3, in addition to the apparatus previously described, there is required three amplifiers respectively 210, 212, and 214 to which the outputs of the state counter, when it is in its respective RL, RP and WP states, are applied to produce the respective output signals CARLA, CARPS, and CAWPS. Two coincidence gates 216 and 218 respectively have applied to their inputs respectively a signal INBFC from an inverter 262 (shown in FIGURE 5) in the external interrupt logic circuit. Also a CAWPS signal obtained from the output of amplifier 214 is applied to these AND gates. AND gate 218 also receives an output signal DL15N from the fifteenth stage of the L-register when in its normal state. Either of the outputs of the gates 216 or 218 in the presence of signals CAWPS and INBFC (false) enables an amplifier 220 whose output inhibits or aborts the reading operation of the computer memory. It should be noted that such inhibit operation, which is initiated at the WP (or write) clock interval of the state counter, actually takes effect during the following read or RL interval of the state counter.

An inverter 222 is driven by the output of a gate 224 which collects its inputs from several stages of the L-register. The output of the inverter will be designated as the INWBI signal. This inverter output is false (INNBIK) whenever the computer is operating in a word or block input logand. This false output (INWBIK) is employed, as will be shown, for the purpose of inhibiting a data interrupt routine since it indicates that the computer is already involved in a data input transfer. Three additional AND gates 226, 228, 230 respectively, having their outputs designated as GAIT, GALIT, GALTM, are required. The input to the GALTM AND gate 230 is derived from predetermined states of the L-register sensed by the AND gate 230 when the data interrupt routine has been terminated. To obtain this signal it is necessary that the last word of the incoming data, which is entered into the L-register from the E-register, should signal via GALTM the end of the interrupt routine. The GAIT output of the gate 226 is obtained when the E-register contains all zeros, indicating that the interrupt mode operation has been initiated. The input to the gate 228 is derived from the L-register and is employed to provide a signal designated as GALIT. This signal indicates that the computer is now in condition to start accepting data, and the data is then entered into the computer from the peripheral device. The GALIT signal occurs in response to the interrupt logand having been transferred from the E-register to the L-register. A signal which may be derived from the computer, for the purpose of initiating an interrupt, is a signal derived from the power supply monitor of the computer which is designated by the letters FDPOWC. This is the signal which occurs when the power supply voltages of the computer are not at a required level and an error might possibly occur if the data interrupt was permitted to take place.

In general, the signal which electrically initiates an interrupt mode in the computer is always generated in the interrupt logic apparatus even though the mechanical action which starts the interrupt chain may be the actuation of a switch on the computer control panel. This interrupt signal (INBFC going false) is designed to have effect only at the completion of a logand. The signal specifically causes the memory read strobe to be inhibited at the start of the next logand which in effect causes an all zeros word to enter the E-register in place of the word which would have been taken from the next cell in the program had the interrupt not occurred. This is shown in FIGURE 3 by the INBFC signal being applied to the two AND gates 216 and 218 and at WP time of the clock counter. The reading circuits as represented by the rectangle designated X and Y circuit are inhibited. Since the E-register does not receive an input it is cleared to the condition where it has all zeros. This all zeros word is sensed by the AND gate 226 to produce the output GAIT.

Once an interrupt has occurred, the program branches to a subroutine whose location in the computer memory is a function of the class of interrupt which has occurred. The mechanism of this will be discussed subsequently herein. Once the branches occur, the computer is said to be in a data interrupt subroutine, or a command reject subroutine or a miscellaneous interrupt subroutine, as the case may be. There is a priority assigned to the occurrence of these interrupts.

Figure 4:
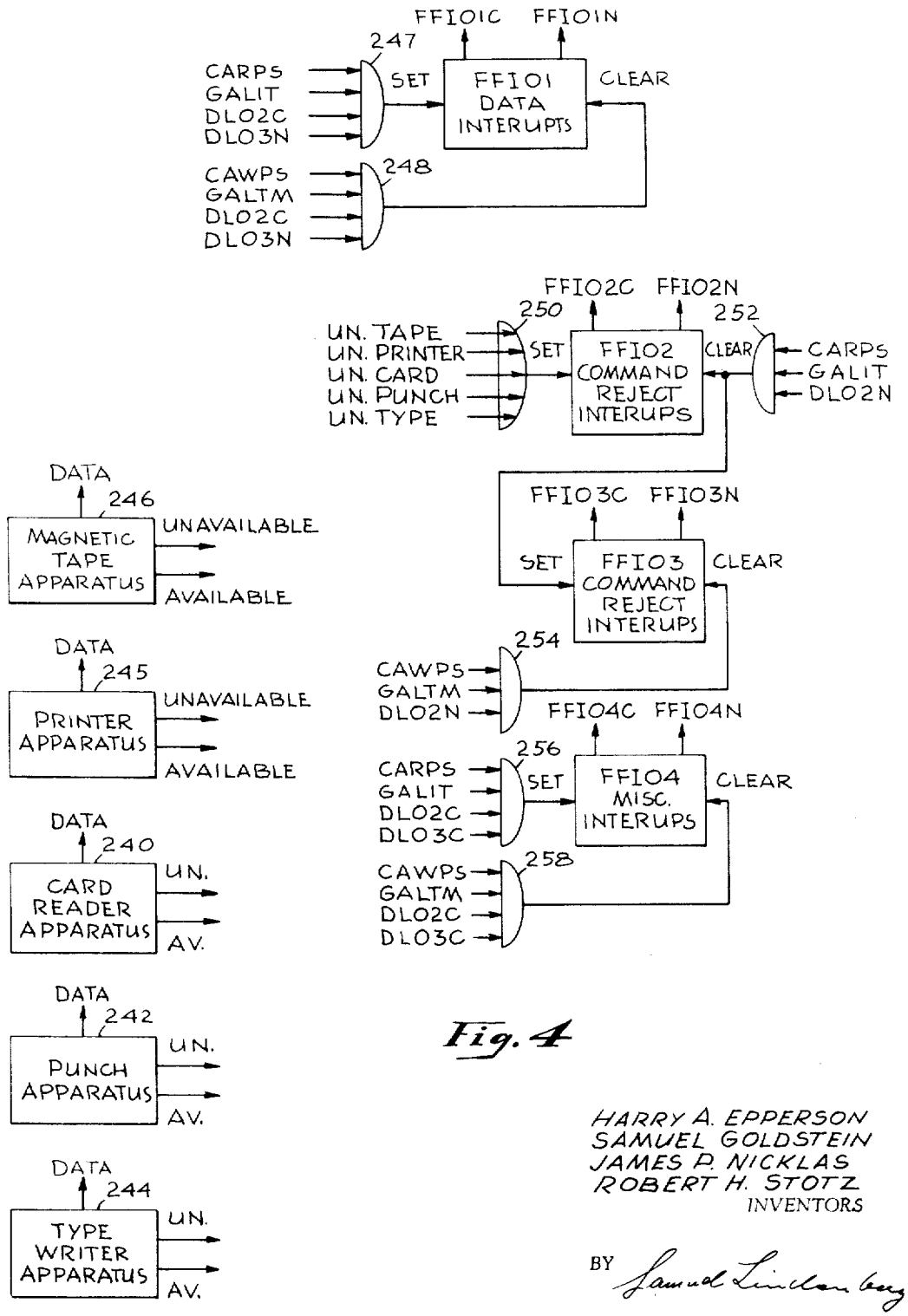
FIGURES 4, 5 and 6 are block diagrams illustrating the interrupt logic apparatus.

By way of example, this invention will be explained with the employment of five external data input devices. As represented in FIGURE 4, one of these is a punch card reader 240. Another is the card read circuits of card punch apparatus hereby designated as punch apparatus 242. Another is an input typewriter 244. Another is printer apparatus 245. And the fifth is a magnetic tape reading arrangement 246. All of these apparatus should, and are able to, provide output signals which indicate whether or not they are available for read-out of data or whether or not they are unavailable. On the outputs designated as unavailable, a signal will occur only when the apparatus is malfunctioning or not functioning. On the outputs labeled as available, a signal will occur when the apparatus is in condition to read out data. A signal does not occur when the apparatus is busy. The malfunction signal of the apparatus is elicited when the computer addresses the apparatus or requests data therefrom.

Four flip-flops respectively designated as FFIO1, FFIO2, FFIO3, FFIO4 are employed for producing signals in the interrupt logic system, utilized in the operation thereof. Flip-flop IO1 operates in conjunction with data interrupts. Flip-flop IO2 and flip-flop IO3 both operate in conjunction with command reject interrupts and flip-flop IO4 operates in conjunction with miscellaneous interrupts. As previously indicated, data interrupts occur when it is desired to enter data into the computer from the peripheral device. Command reject interrupts occur whenever an inoperative external device has been addressed. Miscellaneous interrupts occur as a result of a power failure or when it is wished to enter data from the typewriter, for example, and a predesignated key (such as the apostrophe key) is pressed on the typewriter keyboard. Thereafter data interrupts are generated when valid data keys are pressed.

An AND gate 247 collects signals CARPS, GALIT, DLO2C, DLO3N in order to provide an output which drives the flip-flop IO1 to its set state. In this state it provides an output designated by FFIO1N. An AND gate 248 collects signals CAWPS, GALTM, DLO2C, and DLO3N in order to drive flip-flop IO1 to its clear state wherein the output designated as FFIO1C is obtained.

An OR gate 250 can set the flip-flop IO2 to produce an output FFIO2N whenever any one of the unavailable signals from the magnetic tape apparatus, the printer apparatus, the card reader apparatus, the punch apparatus or the typewriter apparatus, are applied to its input. An AND gate 252 collects CARPS, GALIT, and DLO2N signals in order to provide an output which will drive the flip-flop IO2 to its clear state whereupon it produces an output FFIO2C.

The same signals which drive the flip-flop IO2 to its clear state also operate to drive flip-flop IO3 to its set state. The output at that time from this flip-flop is FFIO3N. Upon the occurrence of signals CAWPS, GALTM and DLO2N flip-flop IO3 is driven to its clear state by means of an AND gate 254 which collects these signals. A flip-flop then produces an output FFIO3C.

Flip-flop FFIO4 is driven to its set state by the output of an AND gate 256. This AND gate is driven in the presence of signals CARPS, GALIT, DLO2C, DLO3C. The flip-flop IO4 is driven to its clear state by the output of an AND gate 258. AND gate 258, in order to produce an output, collects signals CAWPS, GALTM, DLO2C and DLO3C.

The priority of the interrupt, which can occur, is determined by the address which is set into the L-register, in a manner to be described, in the second and third bits thereof. These are the bits which are collected in addition to other signals by the logic which drives the interrupt flip-flops FFIO1 through FFIO4. This logic specifies that if a data subroutine is in process and another data subroutine attempts to occur, it cannot occur until after the termination of the first data subroutine. A miscellaneous interrupt can occur only after termination of the data interrupt subroutine.

Should a command reject subroutine be in a process, then, upon a data interrupt attempting to occur, it can only occur immediately after a logand. A second command reject interrupt would cause the computer to stop. A miscellaneous interrupt could only occur after termination of the command reject subroutine.

If a miscellaneous subroutine is in process, then the attempt of a data interrupt to occur would be successful only after a logand has terminated. Similarly, a command reject could occur only after the logand is terminated. Another miscellaneous interrupt could occur after the termination of the presently occurring miscellaneous interrupt subroutine.

Figure 5:
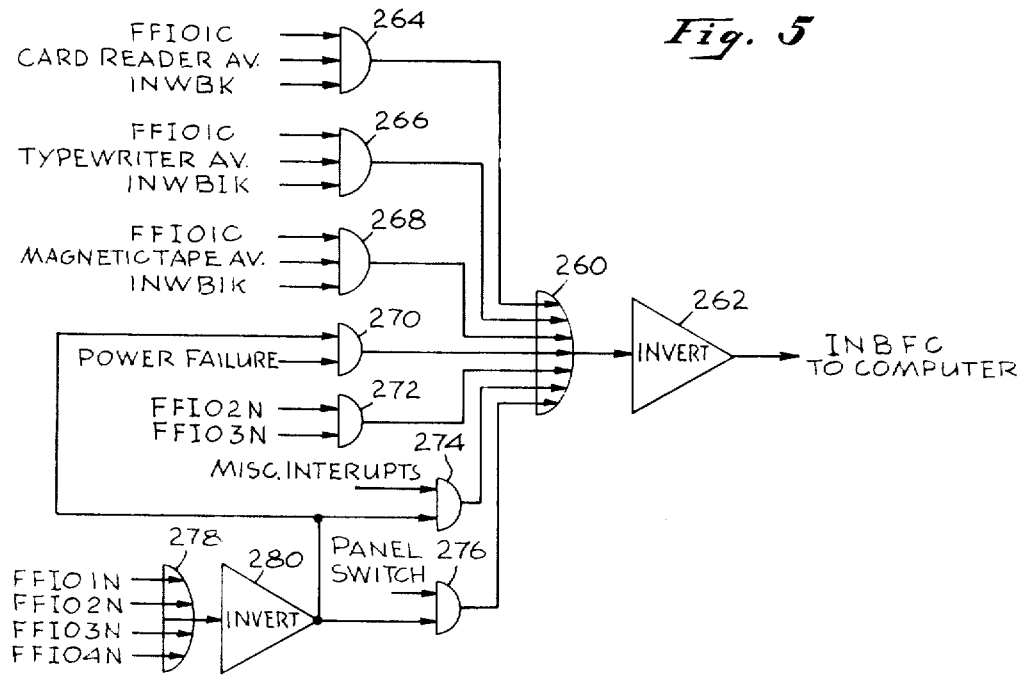

FIGURE 5 shows the logic required for generating the interrupt signal for the computer from signals which have been generated both in the computer and in the interrupt logic apparatus shown in FIGURE 4. This structure for generating the interrupt signal, designated as INBFC for the computer, comprises a single OR gate 260 which drives an inverter 262 with its output, when such output occurs to provide INBFC's K signal. The OR gate 260 is driven in response to and output from any one of the respective AND gates 264, 266, 268, 270, 272, 274 and 276.

AND gate 264 collects the card reader available signal, in addition to the INWBI signal generated within the computer, in the manner shown in FIGURE 3 and the FFIO1C signal of the first flip-flop. AND gate 266 collects the typewriter available signal as well as the INWBI signal from the computer and FFIO1C signal. AND gate 268 collects the magnetic tape available signal as well as the INWBI signal from the computer and signal FFIO1C. AND gate 270 collects the power failure signal as well as a signal indicative of the fact that no interrupt routine is going on. This is derived from an OR gate 278 which is connected to produce an output should any one of the flip-flops FFIO1 through FFIO4 be producing a normal output. The output of the OR gate 278 is applied to an inverter 280, the output of which is applied to AND gates 207, 274 and 276.

AND gate 272 collects outputs from flip-flops FFIO2N and FFIO3C. AND gate 274 collects any one of the miscellaneous interrupt signals which it is desired to employ in addition to those described herein. In addition, of course, AND gate 274 has applied thereto the output of the inverter 280 when there is no interrupt command from the flip-flops.

The AND gate 276, besides having the output of the inverter 280, emits an output whenever a switch on the panel of the computer is thrown (switch not shown), in order to produce a manual interrupt for some desired reason.

The AND gates 264, 266 and 268 produce their outputs when a data interrupt is specified. AND gate 270 produces an output in the presence of a power failure and when there are no other interrupts in progress, as indicated by the output of the inverter 280, AND gate 272 produces an interrupt indicative of a command reject. AND gates 274 and 276 respectively indicate miscellaneous type interrupts with their outputs.

Figure 6:
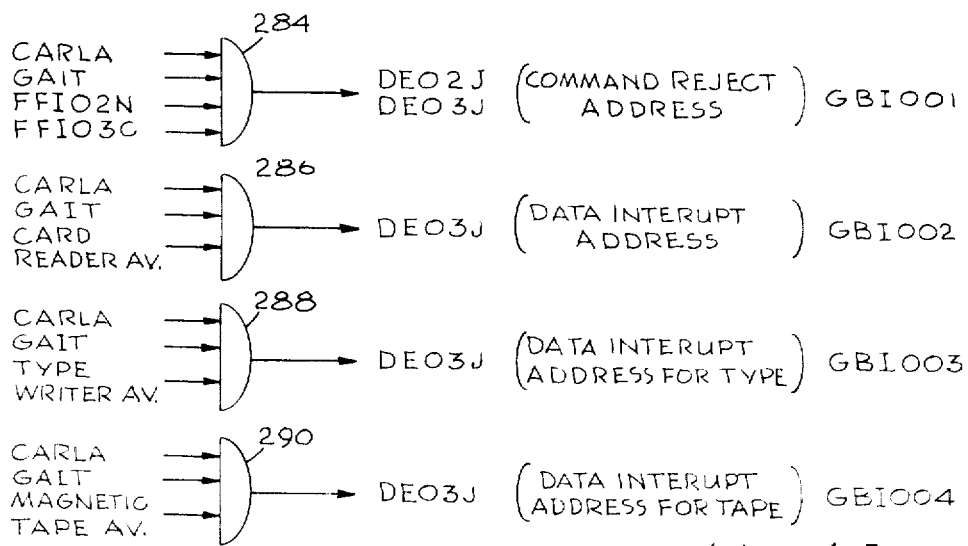

As previously described, the function of the interrupt signal INBFCK causes the occurrence of a signal at the output of the amplifier 220 which inhibits the computer memory read operation which would otherwise follow the WP clock pulse. As a result, an all zeros word appears in the E-register. Gate 226 detects this and provides a GAITS output signal at the succeeding RL clock time. This GAITS signal is employed by the AND gates shown in FIGURE 6 for setting bits 2 and 3 of the computer E-register with scratch pad addresses according to the type of interrupt which has been generated. This is shown in FIGURE 6. AND gate 284 collects signals CARLA, GAIT, FFIO2N and FFIO3C (representative of a command reject address for driving bits 2 and 3 of the E-register from their K to their J states). As shown in the drawing, this represents the output GBIOO1 which is applied to second and third bits of the E-register as shown in FIGURE 3. The AND gate 286 collects input signals CARLA, GAIT, and the card reader available signal to provide an output which drives the third stage of the E-register to its true state. This is shown in FIGURE 3 as a GBIOO2 signal entering the third state of the E-register.

An AND gate 288 collects the CARLA, GAIT and typewriter available signal. With this data interrupt, the output of the AND gate to the E-register sets the third stage of the E-register to its true state. This is the GBIOO3 signal, shown in FIGURE 3.

The AND gate 290 collects the CARLA signal, the GAIT signal, and the magnetic tape available signal. Its output for this type of data interrupt sets the third stage of the E-register to its true state. This is the GBIOO4 signal shown in FIGURE 3.

Miscellaneous interrupts set an octal zero signal in the E-register. The command reject interrupt sets an octal zero six as the scratch pad address, the data interrupt sets an octal zero four as the scratch pad address. Since the secondary field has sixty-four memory locations, at least thirty-two different addresses can be set by the interrupt logic system for as many different varieties of interrupt conditions.

The computer operates to transfer the interrupt logand in the E-register, with its new scratch pad address, to the L-register at the succeeding WL clock pulse and simultaneously therewith the contents of the L-register are transferred to the E-register. The M-register contents remain unincremented. Nothing is read during the succeeding RI clock period, but during the WI period which succeeds the RI period the previous contents of L which were transferred to E are written in the scratch pad address which is in the L-register.

Meanwhile the gate 228 (shown in FIGURE 3) has detected the presence of the interrupt logand in the L-register and produces GALIT output signal. Upon the occurrence of this flip-flop IO1 can be driven to its true state, whereupon the INBFC inhibiting signal is removed. The address in the M-register is transferred to the E-register. It is then stored in the scratch pad memory at a location designated by the interrupt control address plus one in the L-register address designating portion. The contents of the interrupt control address plus one in the scratch pad address portion of the L-register is transferred to the M-register to become the first address of the interrupt subroutine. At this time the computer is in condition to accept data from the device which initiated the interrupt routine. This address information is now already in the M-register and the computer operates on the incoming data in the same manner as it does for incoming data which is ingested in the normal operation of the computer.

The amount of incoming data is finite, that is, a card has been read, or a block of information on tape is completed. The occurrence of no more incoming data is sensed by one of three gates 300, 302, 304, in the input circuits (FIG. 3). The gates respectively sense no more data from the card reader, tape recorder, or typewriter. At the occurrence of WI clock time, this gate releases the computer from its interrupt subroutine. This enables the computer to place a terminate logand into the L-register as well as the interrupt address which was first used at the time of the occurrence of the interrupt command. This address is known since it was inserted into the L-register by whichever one of the gates 286, 288 or 290 was energized. The L-register logand and the M-register address at the time of the occurrence of interrupt routine are then read out of the scratch pad memory in response to the terminate logand. The computer then returns to the operation it would have performed had the interrupt subroutine not been initiated.

It is necessary for the programmer to have initially stored in the computer a terminate subroutine. This is the routine, described above, to which the computer is directed by the "no more incoming data" signal from one of the gates 300, 302, 304. This subroutine is stored in the computer memory in the usual manner and when the indicated signal occurs, the terminate logand and the scratch pad address required are read out of the memory.

The gate 230 (FIG. 3) senses the presence of the terminating code in the L-register and produces an output GALTM which together with the other required signals as sensed by the AND gate 248 returns flip-flop IO1C to its reset state.

To summarize the foregoing description, when a piece of peripheral equipment desires to enter data into the computer, it provides an available signal. The computer provides a signal which indicates whether or not it can accept such data. If the computer signal (INWBI) indicates it can accept data, then that signal together with the available signal of the peripheral apparatus, together with a signal from FFIO1 indicative of the fact that no other data interrupt is in progress, are combined to provide an interrupt signal which is applied to the computer. In response to this interrupt signal, the computer forms an interrupt command (all zeros in the E-register). It signals to the interrupt logic circuits this fact (GAIT) in response to which an address is entered into the computer which indicates where in the computer memory the command being carried out just before the occurrence of the interrupt signal can be stored. Provision is made in the computer for storing at this time anything else which will be needed for continuing the operation of the computer after the termination of the interrupt sequence.

When the computer receives the address signal, these together with the interrupt command are recognized and the computer emits a signal (GALIT) which sets FFIO1. This turns off the interrupt signal and enables the computer to receive data from the peripheral device and to function in response thereto. The end of incoming data is sensed and the computer interprets this as the termination of the interrupt routine. The computer, in response to this signal (GALTM), resets itself so that it can continue its former operation. The interrupt logic system is also reset in response to this terminating signal.

The control logic of FIGURE 5 sets up the priority involved in the interrupt logic since, as may be seen, once a data interrupt is under way, the FFIO1C signal is no longer present. Thus a command reject interrupt, which is initiated by the AND gate 272, could take place with the result that the computer would be stopped. This can be seen by the fact that the computer would react as it did in response to the INBFCK signal just as if it occured for the first time. However, after the E-register would be filled with zeros, no address would be inserted therein and no GALIT signal could be sent.

In the event that the difficulty with the peripheral device which originally emitted an unavailable signal is cleared, so that the data interrupt could then be processed, then the computer will react to the data interrupt in the normal manner except that, upon the occurrence of the GALIT signal, flip-flop IO2 is reset and flip-flop IO3 is set. This serves to indicate that a command reject interrupt had occurred.

A further utilization of the interrupt logic apparatus is to signal to an operator whenever the interrupt operation occurs and also the nature of the interrupt. This assists in servicing peripheral equipment. Since it is well known in the art to indicate the states of a flip-flop or register stage by the presence or absence of lights, either the states of the flip-flops IO1 through IO4 may be wired to a control panel for this purpose, or it may be desirable to inject bits into the registers of the computer in the manner that the address is injected for the purpose of representing both the fact that the computer is in an interrupt mode and also the nature of the interrupt.

There has accordingly been described and shown herein a novel, useful and unique system for generating interrupt signals, establishing a priority as determined by the nature of the interrupt signal, for applying the interrupt signal to a computer, for utilizing answering signals from the computer, in order to instruct the computer where to store any data within the computer which is to be recalled at the termination of the interrupt, and for sensing when the interrupt is terminated whereupon both computer and interrupt systems are reset.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The embodiments of the invention in which an exclusive property or privilege is claimed are defined as follows:

1. In a system wherein peripheral data storage equipment is employed with a computer having a memory and which computer operates in response to command signals, said equipment providing an equipment available signal when it is ready to provide data to be stored in said computer memory, the improvement in an interrupt operation comprising:
   means responsive to said equipment available signal for generating an interrupt signal,
   means for inhibiting read-out operation of the computer memory responsive to said interrupt signal,
   means for applying said interrupt signal to said means for inhibiting,
   means responsive to the inhibition of said memory read-out operation for generating an interrupt command,
   data means responsive to said interrupt command and to the equipment available signal for generating a memory address signal,
   register means, means for entering said memory address signal into said register means,
   means in said computer responsive to said interrupt command and said memory address signal in said register means for storing in said computer memory at the designated address data in said computer required to be used at the termination of said interrupt operation, and
   means responsive to said address signal in said register means for providing a signal indicative of the availability of said computer to accept data from said peripheral equipment.

2. In a system wherein it is desired to interrupt, responsive to the occurrence of each of several possible external conditions, the operation of a stored program computer having a memory with read-out and write-in capabilities in order to instruct the computer to carry out a subroutine uniquely related to the occurring condition:
   means for generating in response to the occurence of any of said conditions a first signal uniquely related to the occurring condition,
   means in said computer for providing a second signal,
   a first logic circuit in said computer responsive to the concurrence of said first and second signals for developing a third signal,
   means responsive to said third signal to inhibit read-out by said computer memory,
   means responsive to said memory read-out being inhibited to establish an interrupt command,
   register means, address means responsive to said first and third signals for establishing an address in said register means uniquely related to said unique first signal, means responsive to said address in said register for performing a subroutine stored in a memory location specified by said address, and means for storing data in said computer memory required at the termination of said subroutine.

3. In a system wherein it is desired to interrupt, responsive to the occurrence of each of several possible external conditions, the operation of a stored control computer having a memory with read-out and write-in capabilities in order to instruct the computer to carry out a subroutine uniquely related to the occurring condition:

means for generating in response to the occurence of any of said conditions a first signal uniquely related to the occurring condition, means in said computer for providing a second signal, a first logic circuit in said computer responsive to the concurrence of said first and second signals for developing a third signal, means responsive to said third signal to inhibit read-out by said computer memory, means responsive to said memory read-out being inhibited to establish an interrupt command, a register, address means responsive to said first and third signals for establishing a first address in said register uniquely related to said unique first signal, means responsive to said address in said register for performing a subroutine stored in a memory location specified by said address, means for storing data in said computer memory required at the termination of said subroutine, and priority means in said computer inhibiting the response of said computer to all but one of said first signals when more than one of said conditions occur concurrently.

4. In a system wherein it is desired to interrupt the operation of a computer having a memory with read-out and write-in capabilities, said computer operating in response to internal commands, in order to instruct it to carry out a subroutine in conjunction with peripheral equipment which can provide a first output signal indicative of equipment availability and a second output signal indicative of a malfunction, said computer including means for providing a third output signal indicative that said computer is in condition to be interrupted, said system comprising:

a first AND gate, means for applying said first and third output signals to said first AND gate to provide a first AND gate signal, a second AND gate, means for applying said second and third output signals to said second AND gate to provide a second AND gate signal, an OR gate, means for generating an interrupt signal responsive to an output from said OR gate, means for applying said first and second AND gate signals to said OR gate input to enable it to provide an output responsive to either, means responsive to said interrupt signal to inhibit read-out by said computer memory, means responsive to said memory read-out being inhibited to establish an interrupt command therein, register means, first address means responsive to said first output signal and said interrupt command for establishing a first address in said register means, and second address means responsive to said second output signal and said interrupt command for establishing a second address in said register means.

5. In a system wherein it is desired to interrupt the operation of a computer having a memory with read-out and write-in capabilities, said computer operating in response to internal commands, in order to instruct it to carry out a subroutine in conjunction with peripheral equipment which can provide a first output signal indicative of equipment availability and a second output signal indicative of a malfunction, said computer including means for providing a third output signal indicative that said computer is in condition to be interrupted, said system comprising:

a first AND gate, means for applying said first and third output signals to said first AND gate to provide a first AND gate signal, a second AND gate, means for applying said second and third output signals to said second AND gate to provide a second AND gate signal, an OR gate, means for generating an interrupt signal responsive to an output from said OR gate, means for applying said first and second AND gate signals to said OR gate input to enable it to provide an output responsive to either, means responsive to said interrupt signal to inhibit read-out by said computer memory, means responsive to said memory read-out being inhibited to establish an interrupt command therein, register means, first address means responsive to said first output signal and said interrupt command for establishing a first address in said register means, second address means responsive to said second output signal and said interrupt command for establishing a second address in said register means, means for storing data in said computer memory required at the termination of said subroutine in the address location specified in said register means, means responsive to the interrupt command and first address in said register means for performing the specified subroutine in conjunction with said peripheral equipment, and means responsive to the interrupt command and second address in said register means for providing an indication of said peripheral equipment malfunction.

6. In a system wherein it is desired to interrupt the operation of a computer having a memory with read-out and write-in capabilities, said computer operating in response to internal commands, in order to instruct it to carry out a subroutine in conjunction with peripheral equipment which can provide a first output signal indicative of equipment availability and a second output signal indicative of a malfunction:

means in said computer for providing a third output signal, a first logic circuit in said computer responsive to the concurrence of said third signal with said first and second signals for respectively developing fourth and fifth signals, means for generating an interrupt signal responsive to either of said fourth and fifth signals, means responsive to said interrupt signal to inhibit read-out by said computer memory, means responsive to said memory read-out being inhibited to establish an interrupt command, register means, first address means responsive to said first output signal and said interrupt command for establishing a first address in said register means, second address means responsive to said second output signal and said interrupt command for establishing a second address in said register means, means for storing data in said computer memory required at the termination of said subroutine in the address location specified in said register means, means responsive to the interrupt command and first address in said register means for performing the specified subroutine in conjunction with said peripheral equipment, and means responsive to the interrupt command and second address in said register means for providing an indication of said peripheral equipment malfunction.

References Cited by the Examiner

UNITED STATES PATENTS

| | | | |
|---|---|---|---|
| 3,048,332 | 8/1962 | Brooks et al. | 235—157 |
| 3,061,192 | 10/1962 | Terzian | 235—157 |
| 3,063,036 | 11/1962 | Reach et al. | 340—172.5 |
| 3,079,082 | 2/1963 | Scholten et al. | 235—157 |
| 3,201,760 | 8/1965 | Schrimpf | 340—172.5 |
| 3,208,048 | 9/1965 | Kilburn et al. | 340—172.5 |

ROBERT C. BAILEY, *Primary Examiner.*

P. J. HENON, *Assistant Examiner.*

UNITED STATES PATENT OFFICE
CERTIFICATE OF CORRECTION

Patent No. 3,293,610                    December 20, 1966

Harry A. Epperson et al.

It is hereby certified that error appears in the above numbered patent requiring correction and that the said Letters Patent should read as corrected below.

Column 4, line 35, after "incremented" insert -- is determined --; column 8, line 64, after "applied" insert -- in order --; column 11, line 19, for "and" read -- an --; line 37, for "207" read -- 270 --; column 15, line 24, before "address" insert -- first --.

Signed and sealed this 14th day of January 1969.

(SEAL)
Attest:

Edward M. Fletcher, Jr.                        EDWARD J. BRENNER

Attesting Officer                              Commissioner of Patents